United States Patent
Matta Adiseshaiah et al.

(10) Patent No.: US 12,360,989 B1
(45) Date of Patent: Jul. 15, 2025

(54) DATA INTEGRATION IN AN INFORMATION PROCESSING SYSTEM

(71) Applicant: Dell Products L.P., Round Rock, TX (US)

(72) Inventors: Arvind Babu Matta Adiseshaiah, Bangalore (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/412,860

(22) Filed: Jan. 15, 2024

(51) Int. Cl.
G06F 16/00 (2019.01)
G06F 16/242 (2019.01)
G06F 16/245 (2019.01)

(52) U.S. Cl.
CPC ........ *G06F 16/245* (2019.01); *G06F 16/2423* (2019.01)

(58) Field of Classification Search
CPC .. G06F 16/254; G06F 9/44505; G06F 3/1207; G06F 8/654; G06F 8/71; G06F 9/382; G06F 8/20; G06F 8/70; G06F 16/24573; G06F 16/24575; G06F 3/1222; G06F 9/52; G06F 11/302; G06F 16/116; G06F 16/23; G06F 16/248; G06F 16/26; G06F 16/258; G06F 16/951; G06F 18/22; G06F 3/165; G06F 40/103; G06F 16/144; G06F 16/328; G06Q 10/04; H04L 67/08; H04N 21/237

See application file for complete search history.

(56) References Cited

U.S. PATENT DOCUMENTS

| | | | |
|---|---|---|---|
| 2006/0259326 A1* | 11/2006 | Ambekar | G16H 10/65 340/572.1 |
| 2016/0232624 A1* | 8/2016 | Goldberg | G06Q 30/08 |
| 2018/0109955 A1* | 4/2018 | Nixon | H04L 67/75 |
| 2022/0114184 A1* | 4/2022 | Sharma | G06F 16/24573 |
| 2022/0261669 A1* | 8/2022 | Matsubara | G06N 5/043 |

OTHER PUBLICATIONS

Graphql Contributers, "GraphQL," https://spec.graphql.org/draft/, Accessed Jan. 15, 2024, 200 pages.

(Continued)

*Primary Examiner* — Shyue Jiunn Hwa
(74) *Attorney, Agent, or Firm* — Ryan, Mason & Lewis, LLP (57) ABSTRACT

Techniques are disclosed for data management comprising self-service data integration functionalities in information processing systems. For example, a method includes accessing, by a first processing node of an information processing system associated with a data consumer, a schema for a dataset of a data publisher associated with a second processing node of the information processing system. The method utilizes, by the first processing node, the schema to select at least a subset of the dataset. The method generates, by the first processing node, a query to obtain the selected subset of the dataset from the second processing node. The method sends, by the first processing node, the query to the second processing node and then receives, at the first processing node, the subset of the dataset from the second processing node.

20 Claims, 10 Drawing Sheets

(56) References Cited

OTHER PUBLICATIONS

Snaplogic, "Point-to-Point Integration: Advantages, Disadvantages, and Uses," https://www.snaplogic.com/blog/point-to-point-integration-advantages-disadvantages-and-uses, Jan. 12, 2023, 7 pages.
T. Bennett, "The Pros and Cons of Point-to-Point Integration," https://www.integrate.io/blog/pros-cons-of-point-to-point-integration/, Aug. 24, 2023, 14 pages.
Y. Yankovy, "Guide to Software Integration with Examples, Types, and Benefits," https://nix-united.com/blog/guide-to-software-integration-with-examples-types-and-benefits/, Oct. 25, 2023, 19 pages.
Data Sleek, "Data Architecture Services That Fit Your Needs," https://data-sleek.com/data-architecture/, Accessed Jan. 15, 2024, 11 pages.

\* cited by examiner

| Source Schema Field Name | Generic Name | Type | Description |
|---|---|---|---|
| QuoteID | Quote_ID | Access ID | Used to Query Details |
| QuoteName | Quote_Name | String | Name of the Quote |
| QuoteValue | Total_Quote_Value | Decimal | Total Price of the Quote |
| Customer | Customer | Object | Customer Object |
| CustomerID | Customer_ID | Access ID | Used to Query Customer Details |
| CustomerName | Customer_Name | String | Name of Customer |
| Address | Customer_Address | String | Comma Separated Customer Address |
| Products | Products | Object Collection | Collection of Products in the Quote |
| ProductID | Product_ID | Access ID | Use to Query Products Details |
| ProductName | Product_Name | String | Name of the Product |
| Price | Price | Decimal | Price of the Product |

| Select | Consumer Name | Generic Name | Type | Description |
|---|---|---|---|---|
| * | QuoteID | Quote_ID | Access ID | Used to Query Details |
| * | QuoteName | Quote_Name | String | Name of the Quote |
| * | Customer | Total_Quote_Value | Decimal | Total Price of the Quote |
| * | Customer | Customer | Object | Customer Object |
| * | Cust_Name | Customer_ID | Access ID | Used to Query Customer Details |
| * | | Customer_Name | String | Name of Customer |
| | | Customer_Address | String | Comma Separated Customer Address |
| * | Products | Products | Object Collection | Collection of Products in the Quote |
| * | ProductID | Product_ID | Access ID | Use to Query Products Details |
| * | Prod_Name | Product_Name | String | Name of the Product |
| * | Prod_Price | Price | Decimal | Price of the Product |

DATA INTEGRATION IN AN INFORMATION PROCESSING SYSTEM

FIELD

The field relates generally to information processing systems, and more particularly to techniques for data management in such information processing systems.

BACKGROUND

Enterprises continuously strive to offer an ever-growing array of capabilities to their customers. This necessitates different approaches to integrating data across enterprise application programs (applications) that execute across their information technology (IT) platforms (i.e., information processing systems). As such, enterprises have continuously attempted to innovate in the field of integration, e.g., moving from file systems to a microservices-based integration paradigm. However, over the past decade or so, IT integration complexity has steadily increased to the point where it has become quite challenging to manage. Even with the microservices model, IT teams typically rely on point-to-point (P2P) integrations. For example, in all design patterns, the upstream application (e.g., supplier application or data supplier) fixes the payload structure, and downstream applications (e.g., consumer applications or data consumers) are bound to read the fixed format. However, any changes in the payload due to the introduction of a new feature in the system or changes in existing fields can affect multiple applications, even if the new payload changes are only required for a single application.

Such above limitations cause technical issues with respect to resources of the underlying distributed computer network on which the enterprise's IT platform resides and executes. For example, computer processing delays, data storage shortages, and/or communication network congestion occurs, especially when changes in the payload would otherwise cause additional resources to be needed.

SUMMARY

Illustrative embodiments provide techniques for data management comprising data integration functionalities in information processing systems.

For example, in one or more illustrative embodiments, a method comprises accessing, by a first processing node of an information processing system associated with a data consumer, a schema for a dataset of a data publisher associated with a second processing node of the information processing system. The method utilizes, by the first processing node, the schema to select at least a subset of the dataset. The method generates, by the first processing node, a query to obtain the selected subset of the dataset from the second processing node. The method sends, by the first processing node, the query to the second processing node and then receives, at the first processing node, the subset of the dataset from the second processing node.

Such improved data management in accordance with self-service data integration functionalities relieves the burden on compute, storage and/or network resources of an underlying distributed computer network used to provide such functionalities. While advantageously applicable to enterprise environments, it is to be appreciated that computer network improvement techniques described herein are not limited to such particular environments. These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, processing systems comprising compute, storage and/or network resources, other types of processing systems comprising various combinations of physical and/or virtual resources, as well as other types of distributed computer networks.

As mentioned, resources of an underlying distributed computer network on which an enterprise's IT platform resides are adversely impacted by existing data integration approaches implemented across the enterprise's IT platform, e.g., computer processing delays (e.g., causing delayed query response times), data storage shortages (e.g., causing lost data or incomplete data availability), and/or communication network congestion (e.g., causing network bottlenecks) occur, especially when changes associated with one or more enterprise applications executing on the underlying distributed computer network would otherwise cause additional resources to be needed.

By way of example only, enterprises of medium to large scale typically operate at least 40 or more strategic applications that accommodate a very large number (e.g., hundreds, thousands) of customers and partners (e.g., parts providers, transport entities, sellers, etc.) across multiple domains, and all of which may require seamless integration. With so much interconnectivity between these domain applications, IT platforms can become highly volatile and performance-degraded as new capabilities are added. Existing development approaches that rely on adding or extending point-to-point integrations are typically not ideal and can quickly hinder scalability and resilience.

Furthermore, it is realized that silos in application development and data duplication have led to the creation of automated islands, adding another layer of complexity to IT platforms. These systems are not scalable enough to meet the growing needs of enterprises, thereby hindering such growth by adversely impacting the underlying distributed computer network. Still further, removing previously deployed legacy applications is not easy, especially when they are crucial to meeting operational needs. As a result, IT developers are forced to build integrations using a point-to-point (P2P) connectivity approach.

P2P connectivity or integration creates a direct connection between individual computer systems and thus applications thereon by forming a dedicated data link between the individual computer systems to exchange data as per the unique requirements of the supplier application or data supplier. The P2P integration approach is burdensome and does not scale to connect applications which can comprise various and dynamic services and processes.

Moreover, the P2P integration approach has another disadvantage, which is the large amount of data transmitted across the network between the data supplier and the data consumer, resulting in significantly increased network traffic. Still further, as mentioned, the data supplier enforces the data structure or format of the data that is passed on to the data consumer. The data consumer has no control over data elements of interest or how these data elements are passed thereto, which is a common disadvantage of P2P integrations. Additionally, before the data consumer can begin processing the data elements, the data consumer must understand the data supplier's data contract (data structure or format requirements) and perform a complete transform operation into the domain entity contract of the data supplier.

Under this existing P2P integration approach, transactional processing occurs in a single thread. In other words, the data consumer has to wait for the data supplier to provide the complete dataset before transforming and processing the dataset, and only then can the data consumer pass the dataset on to the next data consumer in line. This means that there is little to no time for pre-processing or pre-computing. As a result, computer processing delays, data storage shortages, and/or communication network congestion occurs.

Figure 1:
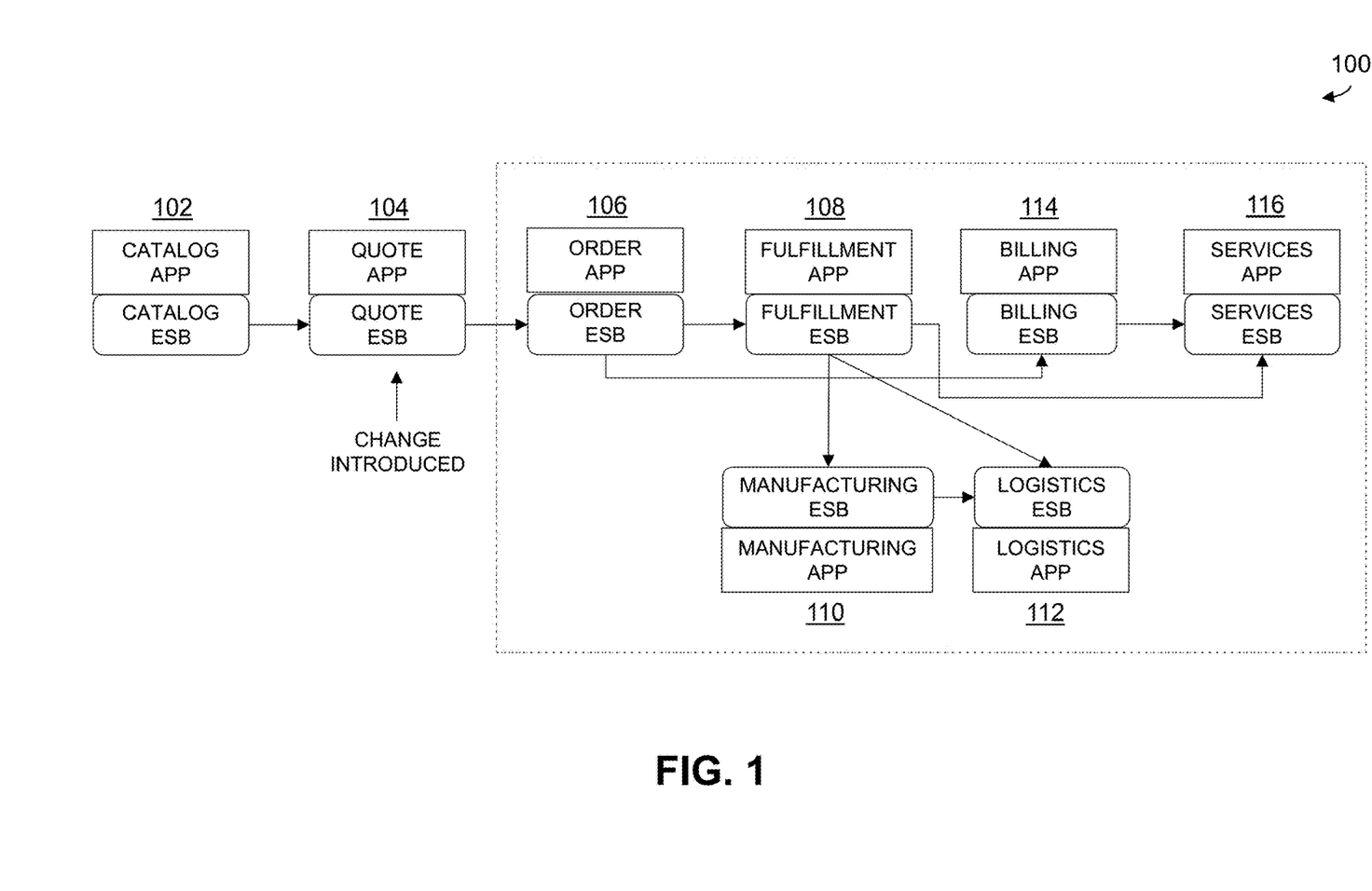
FIG. 1 illustrates an end-to-end data flow across multiple domain applications with which one or more illustrative embodiments can be implemented.

FIG. 1 illustrates an end-to-end data flow 100 across multiple domains comprising applications 102 through 116. As shown, in the FIG. 1 example, application 102 is a catalog application, application 104 is a quote application, application 106 is an order application, application 108 is a fulfillment application, application 110 is a manufacturing application, application 112 is a logistics application, application 114 is a billing application, and application 116 is a services application. Each of applications 102 through 116 has an enterprise service bus (ESB) node. An ESB implements a communication system between mutually interacting applications (e.g., via the respective ESB nodes of applications 102 through 116) in a service-oriented architecture (SOA).

End-to-end data flow 100 illustrates a simplified portion of a product supply chain managed by an enterprise whereby a customer interacts with catalog application 102 to select a product (in the illustrative case of an electronic equipment OEM, e.g., the product may be a host server, storage array, switch, router, etc. for the customer's data center). Quote application 104 computes a quote to the customer for the selected product, and the customer interacts with order application 106 to place the order for the product. Billing application 114 generates an invoice based on information from order application 106. Fulfillment application 108 coordinates with manufacturing application 110 to build the product and both fulfillment application 108 and manufacturing application 110 coordinate with logistics application 112 to have the product delivered to the customer. Fulfillment application 108 also then coordinates with services application 116 such that services application 116 can provide support or other ongoing services to the customer after the product has been delivered.

Although end-to-end data flow 100 in FIG. 1 illustrates a simplified case with only a few applications, it is to be realized that many IT platforms operate with end-to-end process flows with many more (by way of example only, 40 or more) applications.

As shown, assume that a transactional payload (i.e., one or more datasets) in end-to-end data flow 100 traverses through applications 102 through 106. Note that the payload may change from one application to another based on the one or more functionalities or processing of each application. For example, the payload from quote application 104 to order application 106 is a quotation dataset, while the payload from fulfillment application 108 to manufacturing application 110 is a dataset that details the specifics of the customer's order, and so on. Assume further that one application is connected to another application via P2P integration through corresponding ESB nodes to enable transfer of the payload. Proper payload transfer is important to the functioning of each application. Without the transfer of the payload, each application would fail to deliver its intended functionalities or processing.

Assume now that a new logistics requirement is introduced where customers are required to choose, at the time of the quotation, their preferred mode of transportation to have their ordered product delivered to them (e.g., ship, road, or air). To accommodate this requirement, assume a new attribute called 'ShipMethod' has to be integrated (i.e., a change introduced) into the quotation process of quote application 104.

Initially, an IT design team (e.g., each application domain may have its own design team) needs to determine the best placement of this attribute within the payload associated with quote application 104. Given that this payload will be utilized across many other domain applications, e.g., highlighted by dashed box around applications 106 through 116 which are downstream of application 104, it is important for domain subject matter experts to be involved in the design process. Once the design team has reached consensus on the location for the new attribute within the payload, they must also assess whether it will cause any disruptions in the applications that will receive it, e.g., one or more of applications 106 through 116.

After extensive considerations, the design team will identify the applications that necessitate code changes and those that must undergo regression testing. However, a slew of problems is likely to emerge from this process, e.g.: (i) a fulfillment design team thought that including the new attribute in a new field would not cause any issues in fulfillment application 108, but the new field caused an application failure during testing; (ii) a billing design team assumed that the new field would appear in a specific location in the payload, but it actually showed up in a different location causing an issue for billing application 114; (iii) even though the fulfillment design team filtered the new field, manufacturing application 110 did not receive the new field; (iv) a services design team expected the text in the new field to be sent in capital letters, but it was actually sent in lower case letters causing issues in services application 116; and so on.

In a PSP integration approach, a data supplier application defines the data format of its payload and then establishes an integration contract with data consumer applications to attempt to ensure the data consumer applications adopt the data format. Significant design time is spent on defining the integration contract or contract changes between the applications in large Extensible Markup Language/JavaScript Object Notation (XML/JSON) files. Significant development time is spent on finalizing the fields and their locations in the contract between the applications, as well as developing and testing those contract integrations. A significant percentage of the added burden to the resources (e.g., compute resources, storage resources, network resources) of the underlying computer network relates to data integration issues between the applications. Also, it is further realized herein, as illustrated by end-to-end data flow 100, that some applications (e.g., fulfillment application 108) will only become aware of a change (e.g., quote change) when the payload reaches them due to the linear nature of the process.

To summarize, in currently adopted industry P2P integration patterns, the upstream (data supplier) application decides the structure of the payload to be passed to downstream (data consumers) applications. All data consumer applications are required to adhere to the payload structure, creating a tight dependency on the structure of the payload.

In the enterprise ecosystem of an electronic equipment OEM, there can exist over 40 integrated applications ranging from product to manufacturing to logistics. As the integration payload flows from one application to another, it is updated and modified, creating a high degree of dependency on the payload sent by the upstream application. This intricate interdependence on the payload implies that any alterations or the addition of new fields in the payload would have a ripple effect on all applications that process the payload.

Any alterations to existing requirements or the introduction of new ones necessitates changes to the payload structure, which in turn requires lengthy design discussions regarding where the field will be modified or where new fields will be added. These changes result in extended development cycles in multiple applications, requiring code modifications to accommodate the altered payload, even if it is just a pass-through scenario. End-to-end testing, including regression testing of the pass-through applications, is also required.

Such above limitations cause technical issues with respect to the resources of the underlying distributed computer network on which the enterprise's IT platform resides and executes. For example, computer processing delays, data storage shortages, and/or communication network congestion occurs, especially when changes in the payload would otherwise cause additional resources to be needed for integration agreement, code modifications, testing, etc.

Illustrative embodiments overcome the above and other technical data management issues by providing a self-service data integration approach in information processing systems. As will be illustratively explained, a self-service data integration approach allows IT teams to introduce new integrations more quickly because data does not need to be consolidated and centralized across multiple sources of truth, resulting in greater agility across the IT platform. By using improved process orchestration, IT teams can leverage both new and old data definitions and compose them into new service offerings. More particularly, illustrative embodiments transform the data integration concept from an upstream application-driven fixed and constrained payload structure approach (e.g., P2P integration) to a consumer-driven self-service approach with selective data accrual for proper data sequencing of the consumer domain process. By the term "self-service," as used herein, it is illustratively meant that the data consumer is able to decide ("consumer-driven") what part of a dataset from a data publisher it wishes to obtain or accrue.

Figure 2:
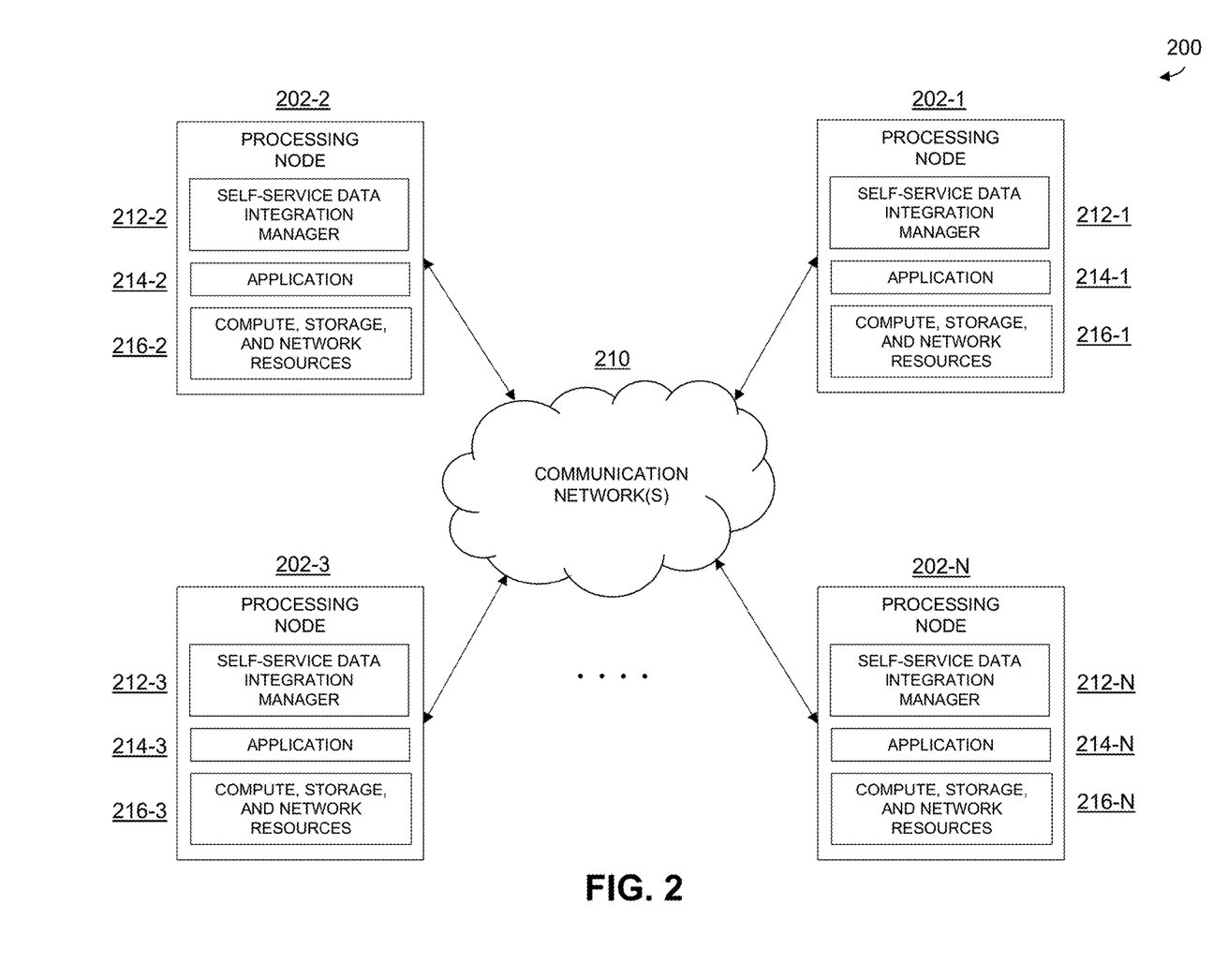
FIG. 2 illustrates an information processing system configured with self-service data integration functionalities according to an illustrative embodiment.

FIG. 2 illustrates an information processing system 200 configured with self-service data integration functionalities according to an illustrative embodiment. As shown, information processing system 200 comprises processing nodes 202-1, 202-2, 202-3, . . . , 202-N (may hereinafter each individually be referred to as processing node 202 or collectively as processing nodes 202). Processing nodes 202 are operatively coupled to one another via one or more communication networks 210.

Processing node 202-1 comprises a self-service data integration manager 212-1, an application 214-1, and a set of compute, storage, and network resources 216-1. Processing node 202-2 comprises a self-service data integration manager 212-2, an application 214-2, and a set of compute, storage, and network resources 216-2. Processing node 202-3 comprises a self-service data integration manager 212-3, an application 214-3, and a set of compute, storage, and network resources 216-3. Processing node 202-N comprises a self-service data integration manager 212-N, an application 214-N, and a set of compute, storage, and network resources 216-N. Self-service data integration managers 212-1, 212-2, 212-3, . . . , 212-N may hereinafter each individually be referred to as self-service data integration manager 212 or collectively as self-service data integration managers 212. Applications 214-1, 214-2, 214-3, . . . , 214-N may hereinafter each individually be referred to as application 214 or collectively as applications 214. Sets of compute, storage, and network resources 216-1, 216-2, 216-3, . . . , 216-N may hereinafter each individually be referred to as set of compute, storage, and network resources 216 or collectively as sets of compute, storage, and network resources 216.

As will be further explained herein, each processing node 202 may correspond with an application domain of a data process flow. For example, in a non-limiting use case, processing nodes 202 may respectively correspond to the application domains mentioned above in the context of FIG. 1 (e.g., catalog, quote, order, fulfillment, manufacturing, logistics, billing, services). Accordingly, in such a non-limiting use case, applications 214 respectively correspond to applications 102 through 116 of FIG. 1. Sets of compute, storage, and network resources 216 may then collectively comprise what is mentioned herein as the resources of the underlying computer system upon which the IT platform resides and executes. Additionally, each self-service data integration manager 212 is configured to provide self-service data integration functionalities to enable a consumer-driven self-service approach with selective data accrual for proper data sequencing of the consumer domain process. Still further, each self-service data integration manager 212 may be configured such that, in some instances, the corresponding processing node 202 is a data supplier (e.g., data publisher) and, in other instances, a data consumer. Further illustrative details of how self-service data integration managers 212 function to provide a consumer-driven self-service approach with selective data accrual for proper data sequencing of the consumer domain process will be described herein below in the context of FIG. 3 through FIG. 5.

It is to be appreciated that self-service data integration functionalities mentioned above in the context of FIG. 2 are not intended to be limited to the specific domain application examples of FIG. 1 or even to enterprise domains in general. Self-service data integration functionalities can be implemented in any information processing system wherein processing nodes transfer various types of data therebetween.

Figure 3:
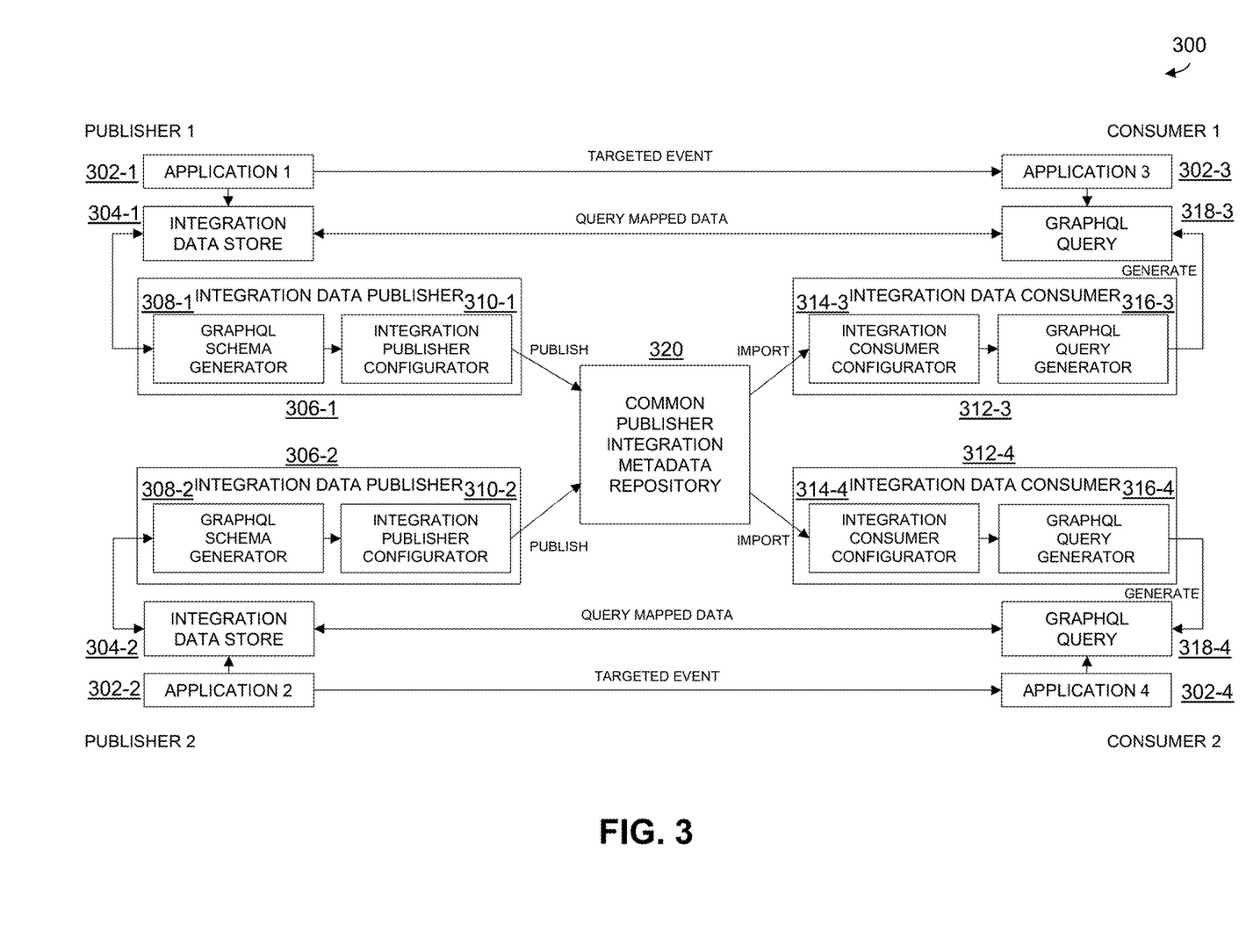
FIG. 3 illustrates a self-service data integration architecture according to an illustrative embodiment.

Turning now to FIG. 3, a self-service data integration architecture 300 is depicted according to an illustrative embodiment. Self-service data integration architecture 300 enables data to be published by data suppliers (e.g., supplier applications) in a manner that enables data consumers (e.g., consumer applications) to select the portion of the published data that the data consumer needs/wishes to obtain. Thus, in comparison to PSP integration where the data supplier fixes the data format and the data consumers are required to receive the complete data in the supplier-driven fixed data format, self-service data integration architecture 300 comprises a data consumer-driven self-service approach with selective data accrual so that the data consumer can choose the data of the published data that the data consumer needs/wishes for proper data sequencing of the consumer domain process and/or for some other technical advantage.

Such improved data management in accordance with self-service data integration functionalities relieves the burden on compute, storage and/or network resources of the underlying distributed computer network used to provide such functionalities, e.g., information processing system 200. By way of example only, a processing node that hosts a data consumer application requires less storage capacity, and needs to provision less computing capacity, since the data consumer application can select a subset of the data published by a data supplier application. Also, network resources are saved since less data is transferred across the network from the data supplier application to the data consumer application. Still further, additional resources are not needed for integration agreement, code modifications, testing, and the like, as mentioned above.

As shown in FIG. 3, self-service data integration architecture 300 depicts a use case comprising two data supplier applications (publishers) and two data consumer applications (consumers). More particularly, application 302-1 (application 1) is considered publisher 1, application 302-2 (application 2) is considered publisher 2, application 302-3 (application 3) is considered consumer 1 and application 302-4 (application 4) is considered consumer 2. However, it is to be appreciated that self-service data integration architecture 300 can be implemented with any number of publishers and/or any number of consumers.

Further, as shown, application 302-1 (publisher 1) is associated with an integration data store 304-1 and an integration data publisher 306-1, which itself comprises a GraphQL schema generator 308-1 and an integration publisher configurator 310-1. Similarly, application 302-2 (publisher 2) is associated with an integration data store 304-2 and an integration data publisher 306-2, which itself comprises a GraphQL schema generator 308-2 and an integration publisher configurator 310-2.

GraphQL is a data tool (available from the Graph QL Foundation) that enables a user to model data (e.g., payload) of an application domain as a graph by defining a schema within which different types of nodes and connections are defined. For example, GraphQL is configured to define a schema that graphically represents relationships (using nodes and connections) between various pieces of data in a dataset. While GraphQL is mentioned in the FIG. 3 example, it is to be appreciated that alternative data tools, including non-graph-based tools, can be used to provide the same or similar data representation schemas.

Still further, as shown, application 302-3 (consumer 1) is associated with an integration data consumer 312-3, which itself comprises an integration consumer configurator 314-3 and a GraphQL query generator 316-3, and a GraphQL query 318-3. Similarly, application 302-4 (consumer 2) is associated with an integration data consumer 312-4, which itself comprises an integration consumer configurator 314-4 and a GraphQL query generator 316-4, and a GraphQL query 318-4.

Each integration data publisher 306-1 and 306-2 publishes metadata to a common publisher integration metadata repository 320 from which each integration data consumer 312-3 and 312-4 can import at least a portion of the published metadata.

In an example where self-service data integration architecture 300 is implemented in information processing system 200, some processing nodes 202 may be configured as data publishers, in which case, integration data publisher 306-1 or 306-2 and integration data store 304-1 or 304-2 would be respectively implemented as part of self-service data integration manager 212 in the given processing node 202. Similarly then, some processing nodes 202 may be configured as data consumers, in which case, integration data consumer 312-3 or 312-4 and GraphQL query 318-3 or 318-4 would be respectively implemented as part of self-service data integration manager 212 in the given processing node 202. However, in some examples, a given processing node 202 may function as a data publisher in some use cases and as a data consumer in other use cases. Thus, self-service data integration manager 212 in such processing node 202 can implement both publisher and consumer architecture components mentioned above. Further, one or more processing nodes 202 can be configured as common publisher integration metadata repository 320.

Self-service data integration architecture 300 implements an integration domain data model with respect to data publishers (e.g., application 302-1 and application 302-2) which is a dynamic framework that empowers each domain or a set of domain applications to define the data they wish to make available to other domains. This approach is fully extensible, allowing for the addition, deletion, or modification of fields. Furthermore, the integration domain data model can be stored in any data store (e.g., integration data store 304-1 and integration data store 304-2), providing fast and efficient data retrieval for real-time results. The data store's particulars are comprehensible to any data consumer (e.g., application 302-3 and application 302-4) in accordance with their dissemination through the integration data publisher (e.g., integration data publisher 306-1 and integration data publisher 306-2).

Each of integration data publishers 306-1 and 306-2 (referred to individually as integration data publisher 306 or collectively as integration data publishers 306) enables universal access to a domain data model field making it available to all consumer applications (e.g., applications 302-3 and 302-4). Each integration data publisher 306 is configured to dynamically generate a GraphQL schema (e.g., via one of GraphQL schema generator 308-1 or 308-2) allowing for a dynamic and intuitive approach to system interaction. Further, each integration data publisher 306 facilitates ease of use and integration by providing a generic field level mapping name for each of the consumer applications (e.g., applications 302-3 and 302-4). Still further, each integration data publisher 306 prioritizes timely and accurate data consumption by alerting registered consumer applications of any changes made to previously mapped fields.

Assume the following example of a quote domain data model object.

First, a quote data store schema is defined with the following fields for simplicity: (i) QuoteID; (ii) QuoteName; (iii) Customer; and (iv) Products. Note that each Quote ID is unique, and each quote corresponds to a single customer with multiple products. An integration domain data structure is then defined as three distinct objects, or tables, namely Quote, Customer, and a collection of Products. Once the data store is defined, integration data publisher 306 reads the data structure and dynamically generates the GraphQL schema via its GraphQL schema generator 308.

Figure 4A:
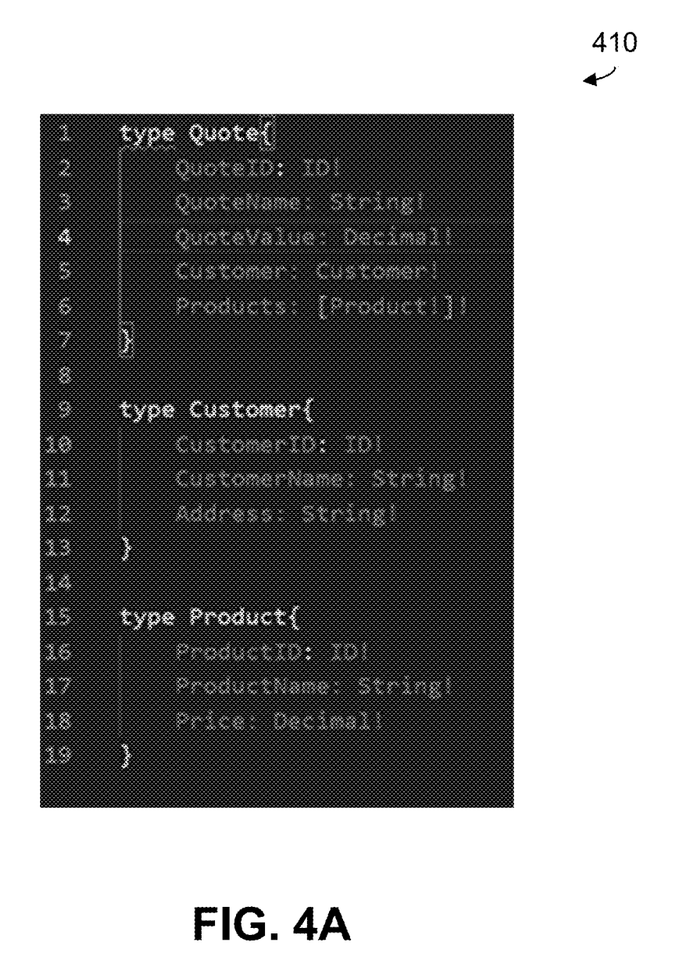
FIGS. 4A through 4D illustrate a domain use case of a self-service data integration architecture according to an illustrative embodiment.
Figure 4B:
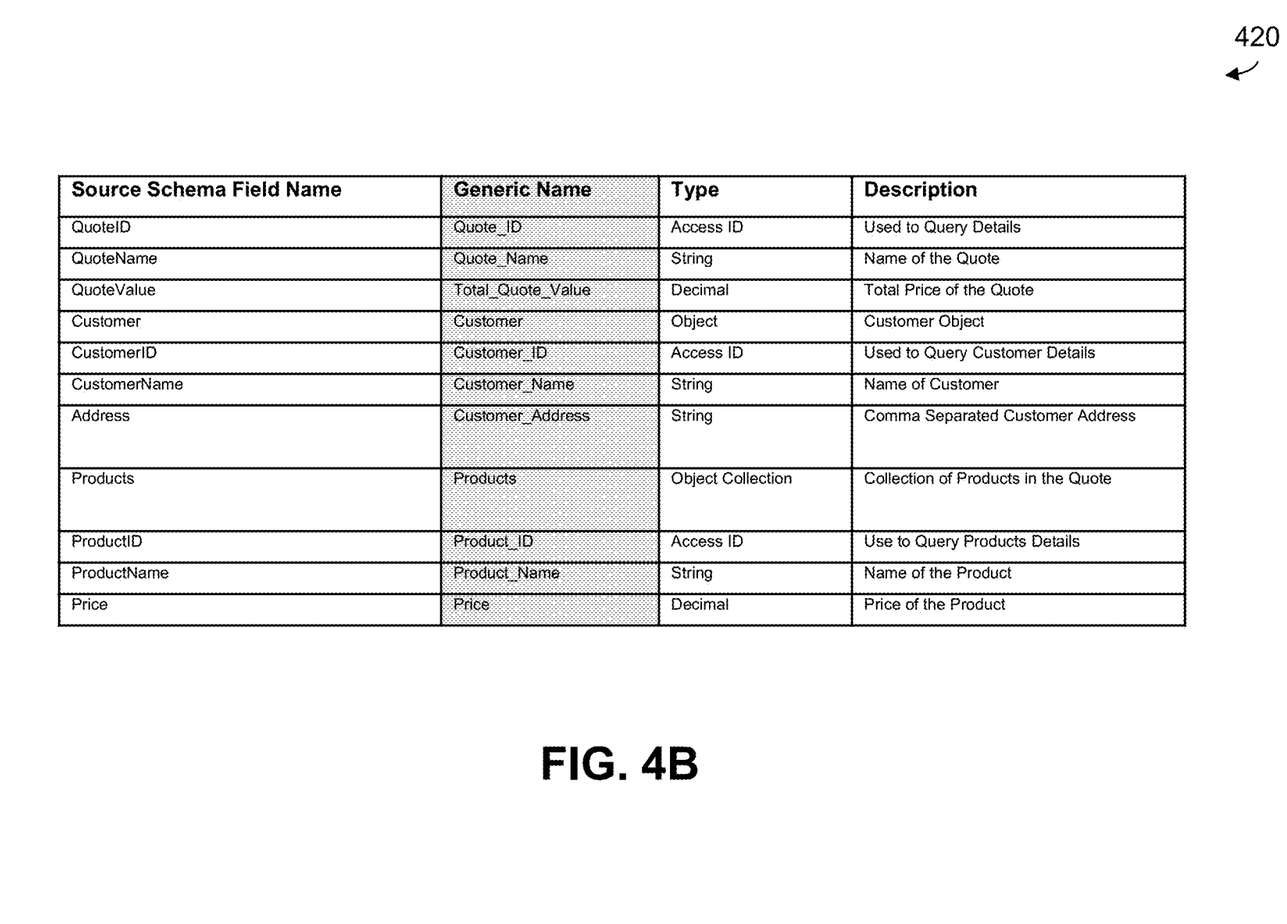

In the example, FIG. 4A illustrates a GraphQL schema 410 that is generated. GraphQL schema 410 is subsequently incorporated into integration publisher configurator 310 of integration data publisher 306, wherein the generic name and characteristics of each field are defined prior to publication to common publisher integration metadata repository 320 for import by the downstream consumer applications (e.g., applications 302-3 and 302-4). Table 420 in FIG. 4B depicts an example wherein the generic name and description of the fields are updated and used to map to respective domain applications of the data consumers.

Once a quote has been created and subsequently populated in the data structure, the corresponding event is published as a targeted event model to registered consumer applications.

Figure 4C:
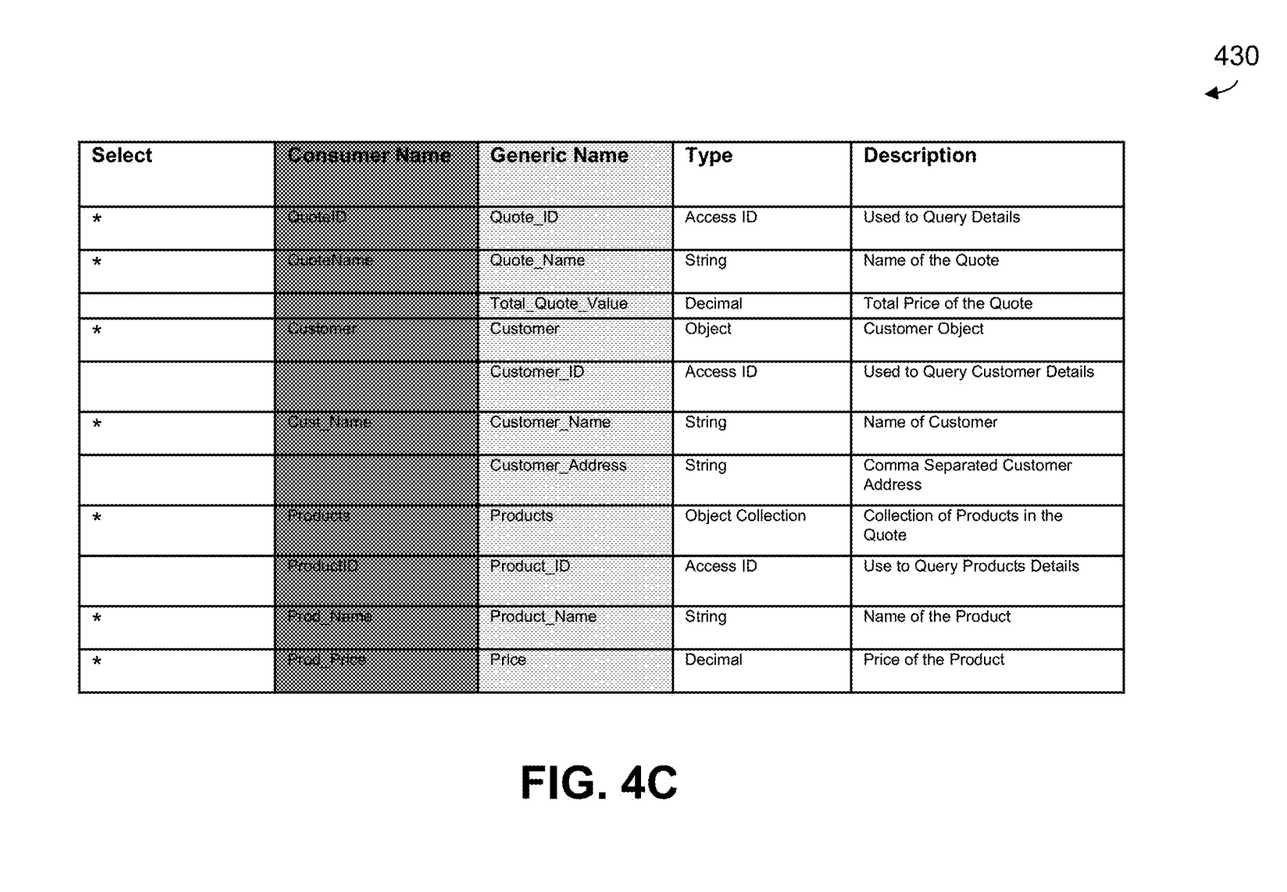

On the data consumer side, a consumer application (e.g., application 302-3 or application 302-4) imports the publisher integration metadata from common publisher integration metadata repository 320, and then selects the data they wish to use and map the data to the desired field name as per the generic name. This can be performed by each integration consumer configurator 314 of each integration data consumer 312. For instance, a consumer may want to use QuoteName, Customer Name, Products, Product Name, and Price, which would be mapped to QuoteName, Cust_Name, Products, Prod_Name, and Prod_Price as shown in table 430 in FIG. 4C. This resultant mapping is then stored as a separate metadata referred to as consumer integration metadata by integration consumer configurator 314.

Figure 4D:
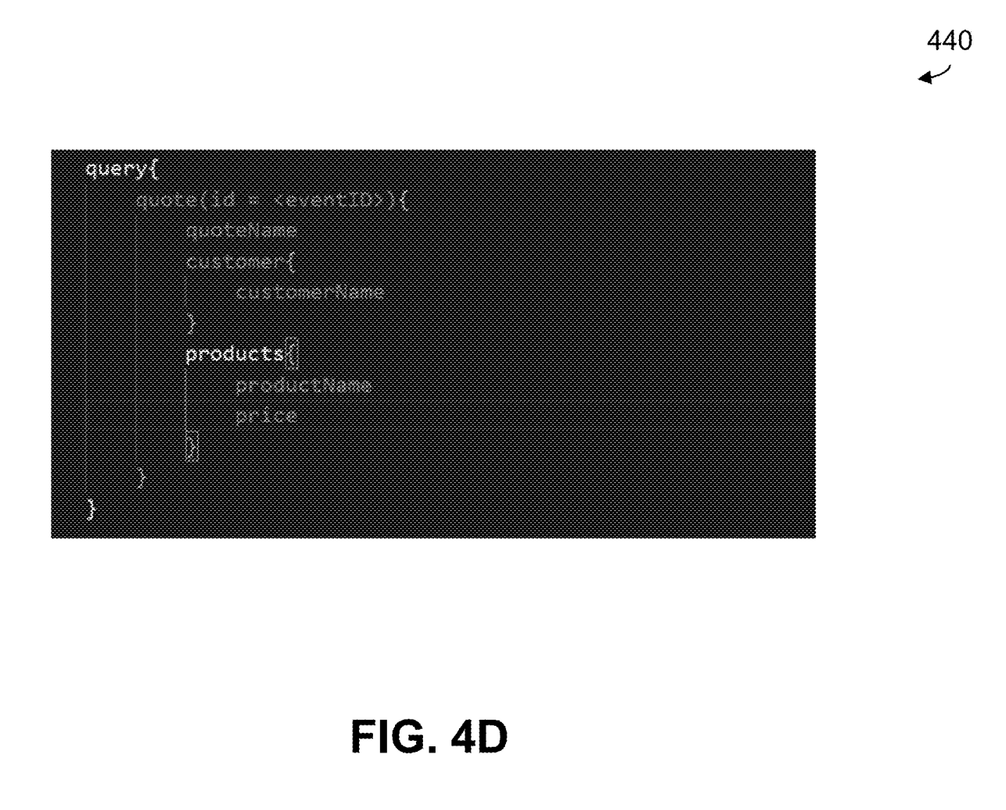

The publisher integration metadata and consumer integration metadata are then processed by GraphQL query generator 316, which accesses the selected field from the consumer integration metadata and retrieves the corresponding original name from the publisher integration metadata, subsequently generating a query 440 as shown in FIG. 4D.

The resulting query is then stored as the GraphQL query 318 with the < > replaced by the targeted event ID, in this use case, the QuoteID from the quote event. GraphQL query 318 is then utilized by the consumer process (e.g., of application 302-3 or application 302-4) to retrieve the data in integration data store 304 on the publisher side once the consumer process receives the event from the publisher. At any given time, the consumer can add or remove fields, and subsequently re-generate the GraphQL query. The query results are then mapped to the field names previously defined by the consumer in the consumer integration metadata.

Moreover, multiple consumers can map different datasets from the publisher, and once the consumer dataset is mapped, it is registered with the publisher. Any changes to the data model will be promptly reported to the consumer.

Referring back to the initial problems of adding shipment information to a quote data model which is only required by the logistics team, with the consumer-driven self-service integration approach described herein, the following steps occur to eliminate these and other problems:

1. Define the shipment data model in the quote data store schema;
2. Update the integration data publisher to generate the GraphQL schema for the new shipment data model;
3. Add the shipment data to the quote event payload;
4. Update the GraphQL query in the consumer integration metadata to include the new shipment data fields;
5. Regenerate the GraphQL schema with the new fields included; and
6. Logistics team can now consume the shipment data through the GraphQL query generated with the updated schema without any impact on other consumers who do not require this new data.

As such, illustrative embodiments advantageously enable, inter alia, adding new data fields to the integration without impacting other consumers or requiring extensive changes to the existing integration infrastructure. Further, illustrative embodiments enable: (i) reduced design time as there is no need to involve subject matter experts in deciding where a new value should be passed; (ii) reduced implementation time as no application needs any code change except the publisher and consumer; (iii) reduced testing time as no regression testing is needed; and (iv) elimination of integration defects caused by field location or field name mismatch, etc.

Figure 5:
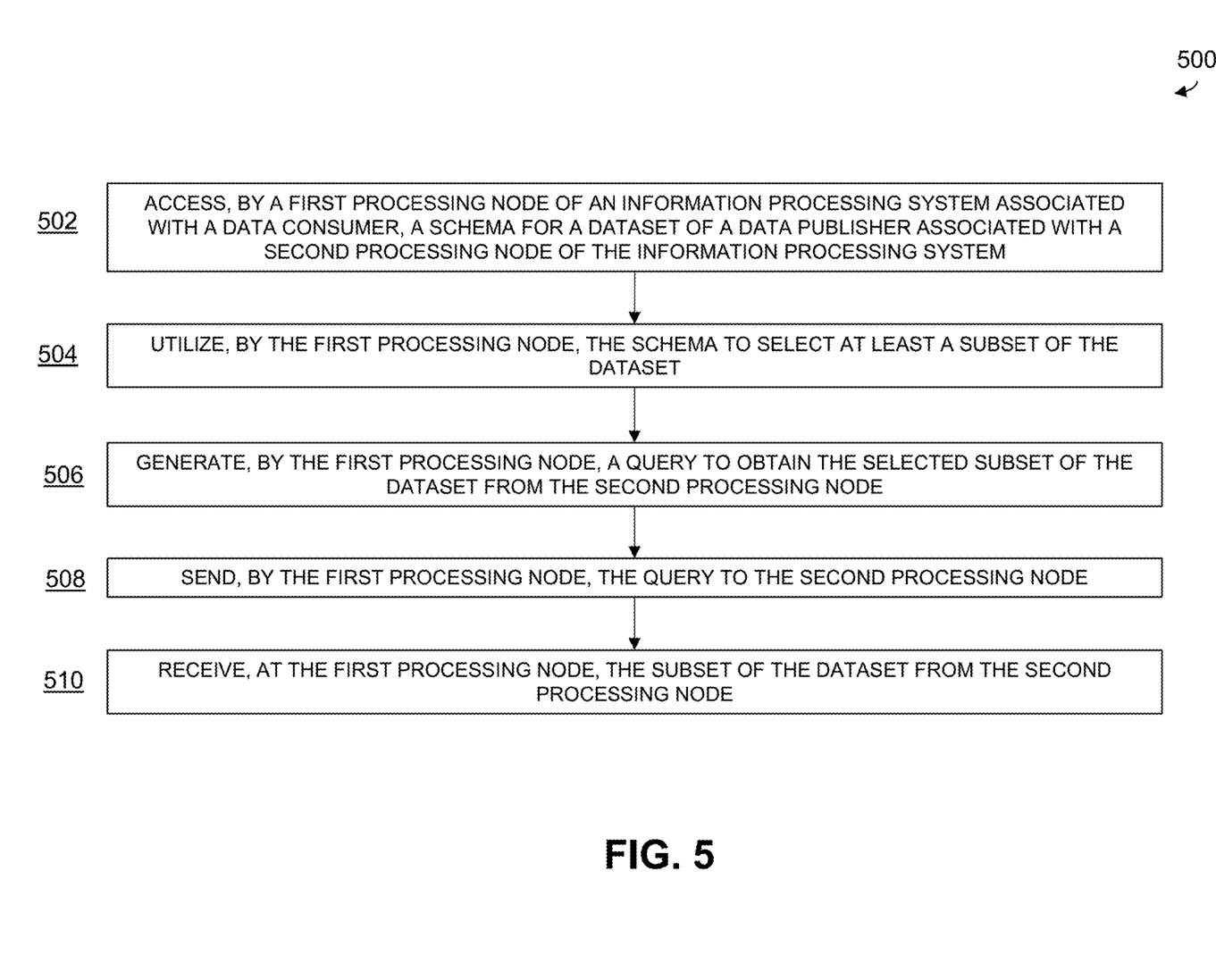
FIG. 5 illustrates a data management methodology with self-service data integration functionalities according to an illustrative embodiment.

FIG. 5 illustrates a data management methodology 500 with self-service data integration functionalities according to an illustrative embodiment. As shown, step 502 accesses, by a first processing node of an information processing system associated with a data consumer, a schema for a dataset of a data publisher associated with a second processing node of the information processing system. Step 504 utilizes, by the first processing node, the schema to select at least a subset of the dataset. Step 506 generates, by the first processing node, a query to obtain the selected subset of the dataset from the second processing node. Step 508 sends, by the first processing node, the query to the second processing node. Step 510 receives, at the first processing node, the subset of dataset from the second processing node.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for application program management using an application assistant will now be described in greater detail with reference to FIGS. 6 and 7. Although described in the context of information processing system environment mentioned herein, these platforms may also be used to implement at least portions of other information processing systems in other embodiments.

Figure 6:
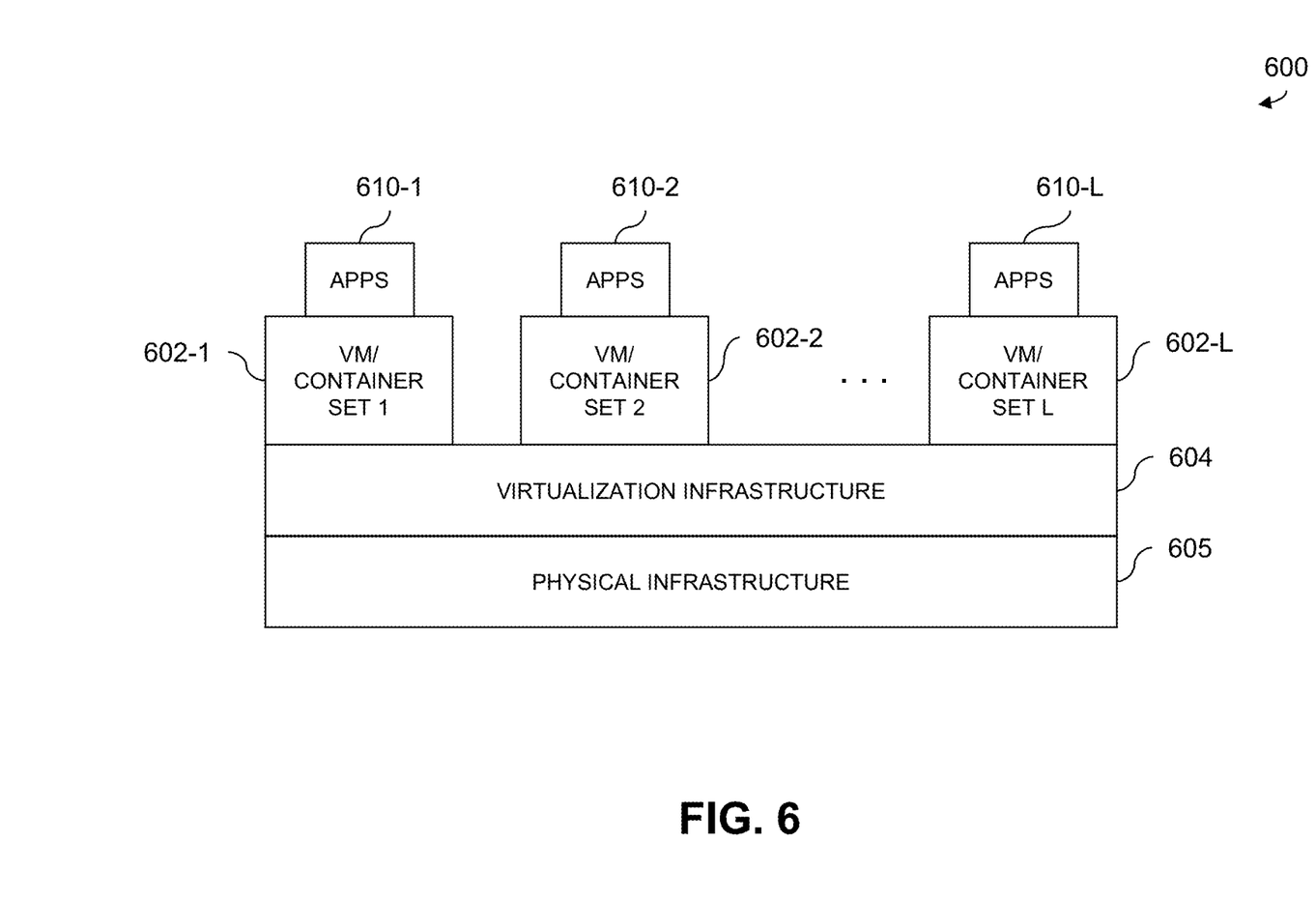
FIGS. 6 and 7 illustrate examples of processing platforms that may be utilized to implement at least a portion of an information processing system in illustrative embodiments.
Figure 7:
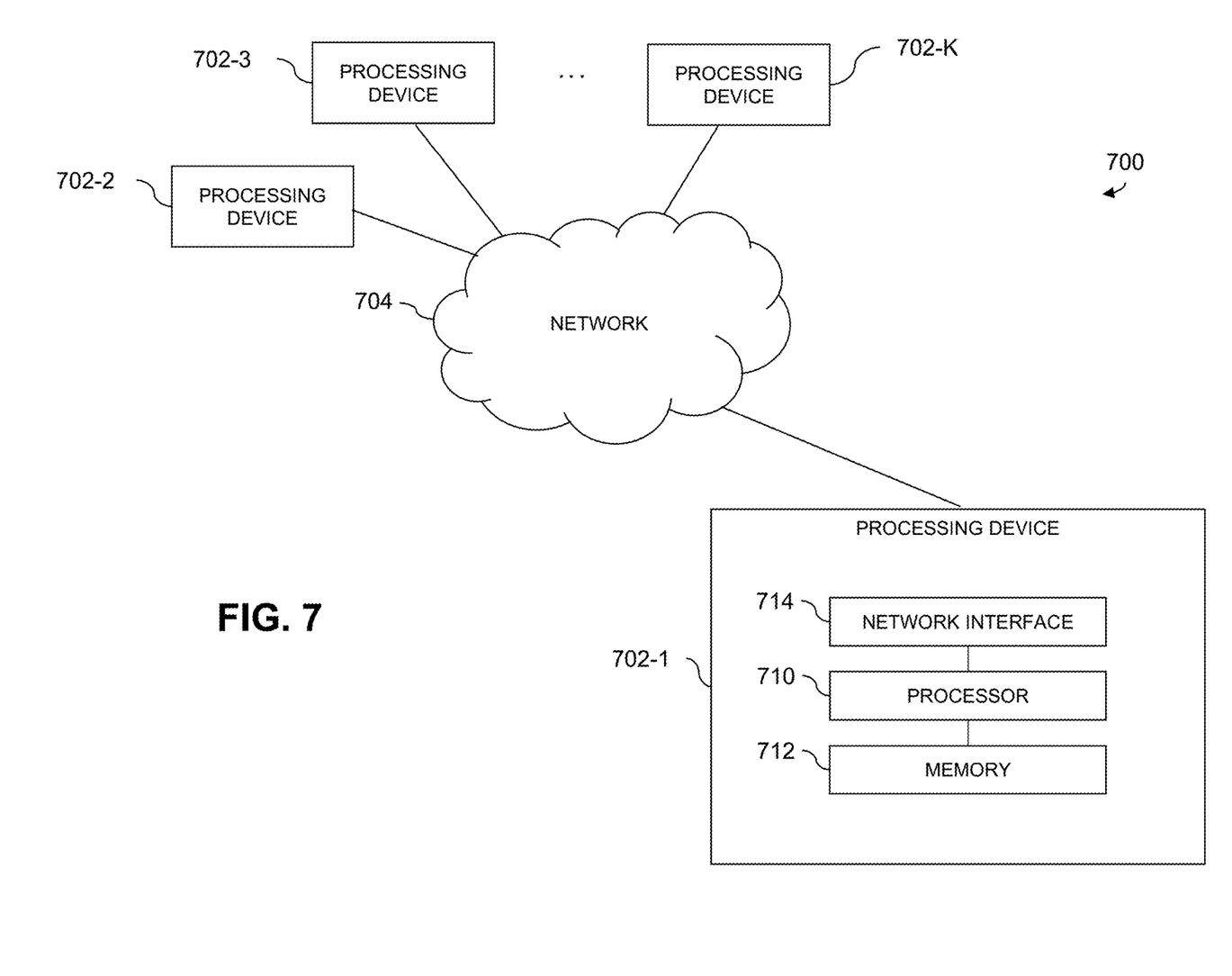

FIG. 6 shows an example processing platform comprising infrastructure 600. Infrastructure 600 comprises a combination of physical and virtual processing resources that may be utilized to implement at least a portion of the information processing system 200 in FIG. 2. Infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

Infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system environments mentioned herein may each run on a computer, server, storage device or other processing platform element. A given such element may be viewed as an example of what is more generally referred to herein as a "processing device." Infrastructure 600 shown in FIG. 6 may represent at least a portion of one processing platform. Another example of such a processing platform is processing platform 700 shown in FIG. 7.

The processing platform 700 in this embodiment comprises at least a portion of information processing system 200 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and information processing system environments mentioned herein may include additional or alternative processing platforms, as well as numerous distinct processing platforms in any combination, with each such platform comprising one or more computers, servers, storage devices or other processing devices. For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for application monitoring with predictive anomaly detection and fault isolation as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, edge computing environments, applications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    accessing, by a first processing node of an information processing system associated with a data consumer, a schema for a dataset of a data publisher associated with a second processing node of the information processing system, wherein the dataset is published by the second processing node and wherein the schema is generated by the second processing node;

utilizing, by the first processing node, the schema to select at least a subset of the dataset, comprising:
  utilizing metadata resulting from the selection of at least the subset of the dataset; and
  mapping the metadata resulting from the selection to corresponding metadata from the schema;
generating, by the first processing node, a query to obtain the selected subset of the dataset from the second processing node;
sending, by the first processing node, the query to the second processing node; and
receiving, at the first processing node, the subset of the dataset from the second processing node.

2. The method of claim 1, further comprising receiving, by the first processing node, a notification from the second processing node when the dataset is initially published.

3. The method of claim 1, further comprising receiving, by the first processing node, a notification from the second processing node when the schema for the dataset has been modified.

4. The method of claim 3, further comprising:
  utilizing, by the first processing node, the modified schema to select at least another subset of the dataset;
  generating, by the first processing node, a modified query to obtain the selected other subset of the dataset from the second processing node;
  sending, by the first processing node, the modified query to the second processing node; and
  receiving, at the first processing node, the other subset of the dataset from the second processing node.

5. The method of claim 1, wherein the schema of the dataset comprises a graph query language-based schema.

6. The method of claim 1, wherein generating, by the first processing node, the query to obtain the selected subset of the dataset from the second processing node further comprises utilizing the corresponding metadata from the schema to generate the query.

7. The method of claim 1, wherein the data consumer comprises a data consuming application program executing on the first processing node.

8. The method of claim 7, wherein the data publisher comprises a data publishing application program executing on the second processing node.

9. The method of claim 8, wherein the data consuming application program is downstream from the data publishing application program in an enterprise-based process flow, and wherein the dataset comprises a transactional payload.

10. An apparatus comprising:
  a processing node of an information processing system associated with a data consumer comprising at least one processor coupled to at least one memory and configured to:
  access a schema for a dataset of a data publisher associated with another processing node of the information processing system, wherein the dataset is published by the other processing node and wherein the schema is generated by the other processing node;
  utilize the schema to select at least a subset of the dataset, comprising:
    utilizing metadata resulting from the selection of at least the subset of the dataset; and
    mapping the metadata resulting from the selection to corresponding metadata from the schema;
  generate a query to obtain the selected subset of the dataset from the other processing node;
  send the query to the other processing node; and
  receive the subset of the dataset from the other processing node.

11. The apparatus of claim 10, wherein the processing node is further configured to receive a notification from the other processing node when the dataset is initially published.

12. The apparatus of claim 10, wherein the processing node is further configured to receive a notification from the other processing node when the schema for the dataset has been modified.

13. The apparatus of claim 12, wherein the processing node is further configured to:
  utilize the modified schema to select at least another subset of the dataset;
  generate a modified query to obtain the selected other subset of the dataset from the other processing node;
  send the modified query to the other processing node; and
  receive the other subset of the dataset from the other processing node.

14. The apparatus of claim 10, wherein the schema of the dataset comprises a graph query language-based schema.

15. The apparatus of claim 10, wherein generating the query to obtain the selected subset of the dataset from the other processing node further comprises utilizing the corresponding metadata from the schema to generate the query.

16. The apparatus of claim 10, wherein the data consumer comprises a data consuming application program executing on the processing node.

17. A computer program product comprising a non-transitory processor-readable storage medium having stored therein program code of one or more software programs, wherein the program code when executed by a processing node of an information processing system associated with a data consumer, causes the processing node to:
  access a schema for a dataset of a data publisher associated with another processing node of an information processing system, wherein the dataset is published by the other processing node and wherein the schema is generated by the other processing node;
  utilize the schema to select at least a subset of the dataset, comprising:
    utilizing metadata resulting from the selection of at least the subset of the dataset; and
    mapping the metadata resulting from the selection to corresponding metadata from the schema;
  generate a query to obtain the selected subset of the dataset from the other processing node;
  send the query to the other processing node; and
  receive the subset of the dataset from the other processing node.

18. The computer program product of claim 17, wherein the processing node is further caused to receive a notification from the other processing node when the schema for the dataset has been modified.

19. The computer program product of claim 18, wherein the processing node is further caused to:
  utilize the modified schema to select at least another subset of the dataset;
  generate a modified query to obtain the selected other subset of the dataset from the other processing node;
  send the modified query to the other processing node; and
  receive the other subset of the dataset from the other processing node.

20. The computer program product of claim 17, wherein the data consumer comprises a data consuming application program executing on the processing node.

* * * * *